April 4, 1961  E. E. BAUMAN  2,978,614
SENSITIVE CONTROL DEVICE
Filed March 14, 1958  5 Sheets-Sheet 1

INVENTOR.
EDWARD E. BAUMAN

FIG. 2A

INVENTOR.
EDWARD E. BAUMAN

April 4, 1961     E. E. BAUMAN     2,978,614
SENSITIVE CONTROL DEVICE
Filed March 14, 1958     5 Sheets-Sheet 3

FIG. 2B

INVENTOR.
EDWARD E. BAUMAN

FIG. 4

United States Patent Office 2,978,614
Patented Apr. 4, 1961

2,978,614

SENSITIVE CONTROL DEVICE

Edward E. Bauman, Galion, Ohio, assignor to North Electric Company, Galion, Ohio, a corporation of Ohio Filed Mar. 14, 1958, Ser. No. 721,522

16 Claims. (Cl. 317—146)

The present invention relates to a novel sensitive control arrangement, and more specifically to a sensitive control device for controlling associated apparatus to operate between predetermined conditions in response to the receipt of control signals having relatively small differential values.

With the comparatively recent discovery of semiconductor materials, and the consequent development of transistor devices, the use of semiconductor units as component parts of electronic systems advanced rapidly in the field. A few of the advantages incident to the use of the novel semiconductor units in a control system include a substantial reduction in the weight and space requirements of the system, increased sensitivity of response to signals of a smaller magnitude, elimination of the bulkier and more expensive high voltage power sources, increased longevity, and reliable operation in environments of shock, acceleration and vibration forces.

In the missile and aircraft field, for example, a control arrangement which is operative with a minimum power input, and which additionally operates reliably in an environment of acceleration, shock and vibration is basic to the successful operation of the aircraft of which it forms a part, and such type equipment constitutes an essential component of the overall system. Other fields have a similar need for control devices which are operative in response to low magnitude input signals and which respond reliably under adverse operating conditions.

Various types of devices including relays, vacuum tubes and transistor units have been developed heretofore in an effort to provide a control device having operating characteristics of such type. A particularly successful embodiment which attains a high degree of sensitivity comprises the utilization of a device including a transistor connected as an operating unit for an associated relay member, the control signal being applied to the transistor, and the relay being connected in the output of the transistor to operate responsive to the coupling of the control signal thereto. One such successful arrangement which is extremely sensitive in response to low magnitude signals has been set forth in Patent No. 2,801,374 to C. G. Svala, which issued July 30, 1957.

In certain applications, however, there is also a need for a device which is operative between at least a first and second position responsive to the application of signals which are not necessarily fixed to and dependent upon the specific characteristics of the components of the device. That is, in the devices known heretofore the input circuit of the transistor arrangement is integrally coupled to the output circuit of the transistor, and the control signal input thereto in each application must be related to the parameters of the transistor amplifier circuit. As a result, each of the devices must be specifically engineered to the particular environment in which they are to be used. The requirement for the repeated engineering necessary to adapt the device for use in the different environments ostensibly results in excessive engineering costs, and is a specific shortcoming of the known type devices. Further, such limitation prohibits the provision of a so-called "stock" item which may be manufactured on an assembly line basis for use in a number of different types of control circuits.

It is an object of the present invention to provide a novel sensitive control device, and particularly a control device which is operative between a first and a second bistable condition in response to the receipt of low magnitude input signals, and which is operative in response to signals which are substantially independent of the polarity, potential and transient voltages of the transistor device which forms a part thereof.

It is a specific object of the invention to provide a control device having an ampere-turn responsive, inductive input arrangement which is operative between pull-in and drop-out conditions in response to the application of control signals of an extremely small differential value.

It is an additional object of the invention to provide a control device which is operative in response to the application of low magnitude signals of the direct current or alternating current species.

These and other objects, advantages and features of the invention will become apparent with the consideration of the following description, claims and drawings which disclose various embodiments of the invention and in which:

The several specific embodiments of the control device, and the method of operation of such devices are now set forth hereat.

General description

Figure 1:
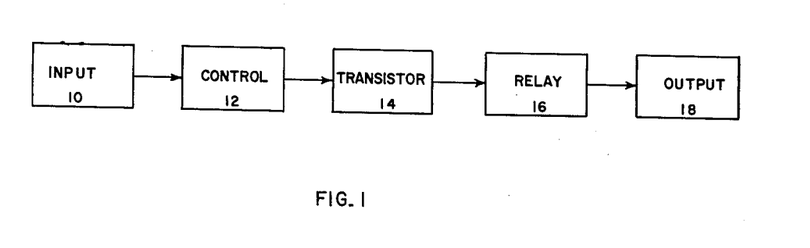
Figure 1 sets forth a schematic representation of the component parts of the novel control device in its several specific embodiments.

With reference to Figure 1, the novel control device in each of several embodiments basically comprises an input circuit 10 over which incoming control signals are coupled to a control stage 12 which alternatively effects operation of a transistor unit 14 in a steady state manner and in an oscillating manner. A relay member 16 is connected in the output circuit of the transistor unit 14. During such period as the transistor unit 14 is energized in the steady state manner, relay member 16 is in the operated condition; and during the period that the transistor unit 14 is energized in the oscillating manner, the relay member 16 is in the non-operated condition. Relay member 16, in turn, is operative to couple control signals over an associated output circuit 18 to equipment connected thereto.

More specifically, with operation of the transistor device as an oscillator, the collector current consists of a pulsating direct current output signal, the average value of which is substantially below the value required to effect operation of relay member 16. That is, the values of the component parts of the control circuit effective during the period of oscillation are selected so as to render the period of conduction of the transistor very short in comparison with the period of non-conduction so that the average direct current during oscillation is of a very low value. The values of the component members effective during the period that the transistor is operated in the steady state manner are selected so that the collector current output is of a steady D.C. value which is substantially greater than the value of current necessary to effect operation of relay member 16. In one particular embodiment the values were chosen so that the current during the non-oscillating state is approximately fifty times the value of the current during the oscillating state, the current conduction of the transistor during the non-oscillating state being approximately two times the value of the current required to operate the relay.

Toroid saturable core device

Figure 2A:
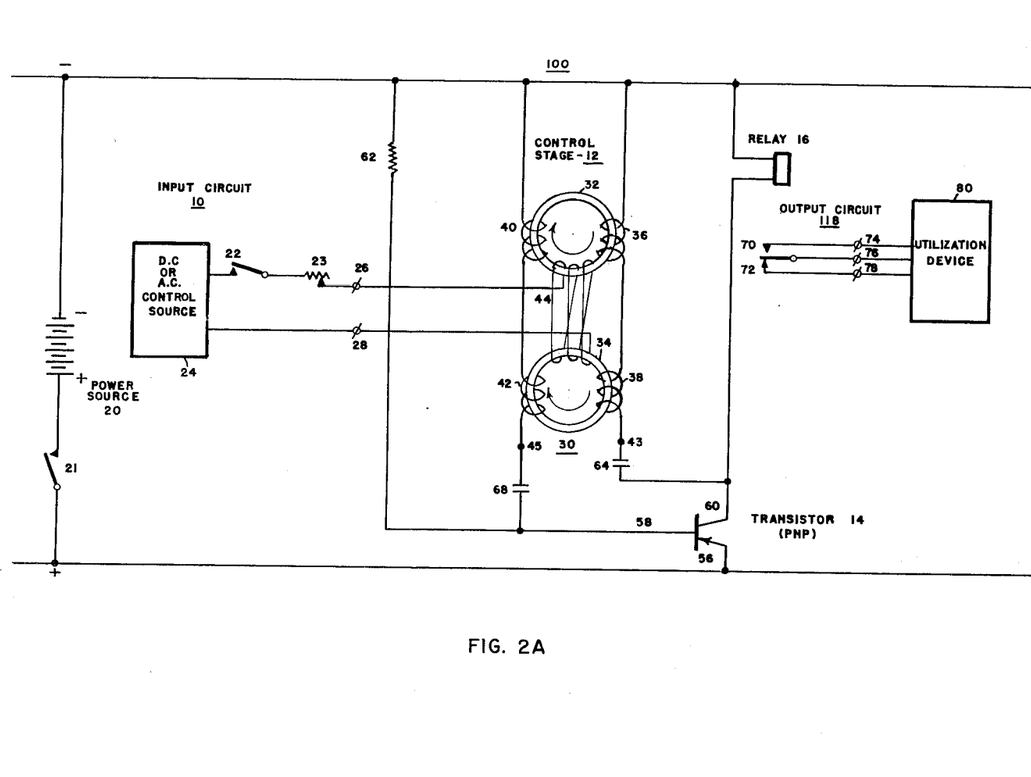
Figures 2A and 2B set forth embodiments of the novel control device which has an electromagnetic control stage including a saturable core device.

In one preferred embodiment of the invention shown in Figure 2A, the device 100 includes an input circuit 10 for supplying direct current or alternating current control signals to the device, and a control stage 12 having saturable core means and electromagnetic winding means for shifting a transistor unit 14 between the oscillatory and non-oscillatory conditions to effect the operation of relay 16 between two bistable conditions.

Such embodiment may be selectively energized from a power source 20 by a switch member 21, and may include an input circuit 10 having a source of direct current or alternating current signals 24, and switch means 22 for coupling the control signal output thereof to the input terminals 26, 28 for the control stage 12.

Figure 5:
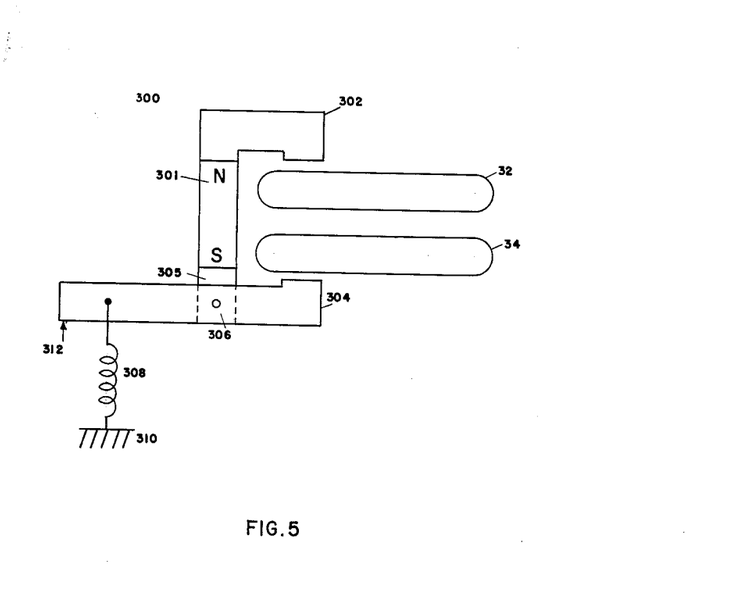
Figure 5 sets forth a permanent magnet control arrangement for the device.

Control stage 12 may comprise a transformer 30 having a pair of toroid cores 32, 34 on which are wound a pair of primary windings 36, 38 respectively, and a pair of secondary windings 40, 42 respectively. Primary windings 36, 38 are coupled in series relation between the control stage input terminal 43 and the negative side of the power source 20; and secondary windings 40, 42 are coupled in series relation between the control stage output terminal 45 and the negative side of power source 20. The windings 36, 38 and 40, 42 are wound relative to each other to provide a 180° phase difference between the control stage input signals which appear at input terminal 43 and control stage output terminal 45 respectively. A control winding 44 is wound common to both cores 32, 34 and is connected to the input terminals 26, 28. Control winding 44 controls the saturation of cores 32, 34 and thereby controls the inductive effect of windings 36, 38 relative to windings 40, 42. Cores 32, 34 in one particular embodiment were constituted of a material commercially available as High Mu80, which is basically comprised of 79 percent Ni, 17 percent Fe, 4 percent Mo. In an actual practice the two cores were mounted in superposed relation such that the planes of the two toroids were in parallel spaced-apart relation as shown in Figure 5. For purposes of simplification of the circuit drawing, however, the toroids have been shown in a single plane in Figure 2A. In either case, the flux generated in toroid 32 by the primary winding 36 is in opposed relation to the flux generated in toroid 34 by the primary winding 38 with the result that the fields relative to the control winding 44 effectively cancel one another and the control winding 44 is effectively free of any induced currents.

Transistor unit 14 may comprise a unit available in the field as a GE 2N241A, which is of the PNP type and includes an emitter element 56, a base element 58, and a collector element 60. The emitter element 56 is coupled to the positive side of the power source 20, base element 58 is coupled over resistance 62 to the negative side of power source 20, and collector element 60 is coupled over relay 16 to the negative side of power source 20. Collector element 60 is also coupled over capacitor 64 to input terminal 43 for the control stage 12, and base element 58 is coupled over capacitor 68 to the output terminal 45 of control stage 12.

Relay 16 controls associated contact set 70, 72 in the interruption and completion of control circuits coupled to the output terminals 74, 76, and 78 respectively. The equipment to be controlled by the device 100 is illustrated schematically as a utilization device 80. In one specific embodiment the relay comprises a device available in the field as North Electric Relay No. 207 ACC 453A which has a pull-in value of approximately 26 ma., and a dropout value of approximately 13 ma., such relay having been described in detail in Patent No. 2,767,280, which issued to Hall et al. on October 16, 1956 and which was assigned to the assignee of this invention.

Resistor 62 may be in the order of 47K, capacitor 64 may be in the order of .25 mfd., and capacitor 68 may be in the order of .02 mfd., it being noted that such values were used in one operative embodiment, and are listed for exemplary purposes and are not to be considered as limiting the scope of the invention.

In operation, in the absence of a control signal at the input terminals 26, 28 of input circuit 10, toroid cores 32, 34 of transformer 30 are in the non-saturated condition, and the cores are conditioned to inductively couple signals which appear in the primary windings 36, 38 into the secondary coils 40, 42 of the transformer 30. Assuming now that switch 21 is closed to couple battery potential to the positive and negative conductors, base element 58 is biased negative relative to emitter 56 to initiate current flow, and in accordance with conventional transistor operation, collector 60, which is negatively biased with respect to base 58, effects an initial current flow through transistor 14 and relay 16.

As the collector element 60 conducts, the changing potential signal which appears in such circuit is coupled over capacitor 64 and input terminal 43 to the series connected primary windings 38, 36 of transformer 30. Since the cores 32, 34 of the transformer 30 are in the non-saturated condition, and act as a coupling device between the primary windings 36, 38 and the secondary windings 40, 42 thereon, a control signal is induced in the secondary windings 40, 42 and coupled over output terminal 45 and capacitor 68 to the base element 58 of the transistor 14.

The potential of the induced control signal appearing at base 58 is negative, causing the base to become more negative, resulting in an increased emitter-base current flow. The low forward resistance of the emitter base circuit, however, keeps the base close to the potential of the positive source. Accordingly, as the potential of point 45 becomes more negative, capacitor 68 charges. The increased emitter-base current flow results in an increased emitter-collector current flow with the result that the collector 60 and point 43 become more positive and point 45 becomes more negative. As a result of progressive potential and current adjustment of this type, the collector rapidly attains a positive potential which is very close to the potential of the emitter with the maximum emitter-collector current flowing at such time. As the maximum collector current-flow is approached and passed, the rate of change of current flow becomes zero and thereafter changes sign, the value of the potential of point 43 reaches a maximum in the positive direction and begins to become more negative, and the potential of point 45 reaches a maximum in the negative direction and begins to become more positive, in turn making the base 58 more positive. As the base 58 becomes as positive as the emitter 60, the emitter-base current flow decreases to almost zero abruptly, i.e., the transistor 14 is blocked. As the transistor becomes blocked, the negative going potential of point 43 due to the rapidly decreasing collector current results in a positive going potential at point 45 such that point 45 is dragged more positive than the positive pole of the battery through the charged condenser 68. When the potential of point 43 passes its most negative value and the potential of point 45 passes its most positive value, capacitor 68 begins to discharge. During such discharge the base 58 becomes less positive, and as the capacitor discharges sufficiently to permit the base 58 to become slightly negative with respect to the emitter 56, the transistor again begins to conduct. The oscillator circuit thus established is free running and continues oscillating in such manner until a further control operation is effected.

The rate of oscillation of transistor 14 is determined by the time constants of resistor 62 and capacitor 68. In the device the circuit constants are selected to provide very short collector conduction periods so that the average collector current flowing through the relay is of a substantially lower value than required to effect the operation thereof. It is apparent from the foregoing description that in the absence of a control signal in the input circuit 10, the relay 16 is maintained in the non-operated condition by reason of the reduced current output of the transistor 14 to relay 16 during operation as a blocking oscillator.

With the application of a control signal to input circuit 10 (which signal may be in the order of 800 microwatts in the embodiment illustrated in Figure 2A), the operation of transistor 14 as a blocking oscillator is interrupted, and the transistor 14 is energized in a steady state manner to effect the operation of relay 16.

More specifically, with the application of an input signal from an associated control circuit 24 over switch 22, rheostat 23, and input terminals 26, 28 to saturate the control winding 44 on the cores 32, 34 of transformer 30, the operation of the transformer 30 as a coupling device is interrupted. As a result, output current from transistor 14 which is coupled to the primary windings 36, 38 no longer induces a current into the secondary windings 40, 42 on transformer 30 and the positive feedback path extending to the base 56 for the transistor 14 is interrupted. With the interruption of the feedback circuit, the transistor no longer oscillates, and a collector current flow results which is determined by the supply voltage for collector 60 and the value of the bias coupled over resistor 62 to the base element 58. The value of such members is selected so that the resulting collector current flow with such condition is of a value in excess of that required to operate relay 16, and the relay 16 is maintained in the operated condition for the period that the control signal is applied to the input circuit 10.

It is apparent from the foregoing description with new type magnetic materials that an extremely low value of input current over input terminals 26, 28 will initiate a substantial current flow over the transistor 14 to operate the relay 16 in the control of the associated output circuit 18.

As is well known in the art, a conventional mechanically operated relay will normally "pull in" at a certain value of current and will "drop out" at approximately one half such current value. As a result the selective control of such relay is frequently insufficient for the purpose desired. According to the mode of operation already described, rheostat 23 is set so that closure of switch 22 allows sufficient current to flow through control winding 44 to saturate the toroid cores 32 and 44. In a second mode of operation, switch 22 is closed to make rheostat 23 effective, and as the movable slider of rheostat 23 is operated over a preassigned range of resistance, the variation in the saturation of the toroid cores 32 and 34 effects the operation and release of relay 16. In the present arrangement, the cores of the transformer 30 are saturated to control the point of operation of the relay responsive to the application of given current flow over input terminals 26, 28, and with new type magnetic material such as High Mu 80, the essentially square hysteresis curve is such that the material becomes non-saturated at a current input value very close to the saturation current value and a closer range of operate and release current values than that of the relay per se are obtained. Thus the ratio of input non-saturation current to input saturation current is greater than the ratio of relay release current to relay operate current. Also the value of input control current is of a lower order than the value of relay control current. Manifestly, a control arrangement of increased sensitivity of signals of smaller differential values is effected.

C and I saturable core device

Figure 2B:
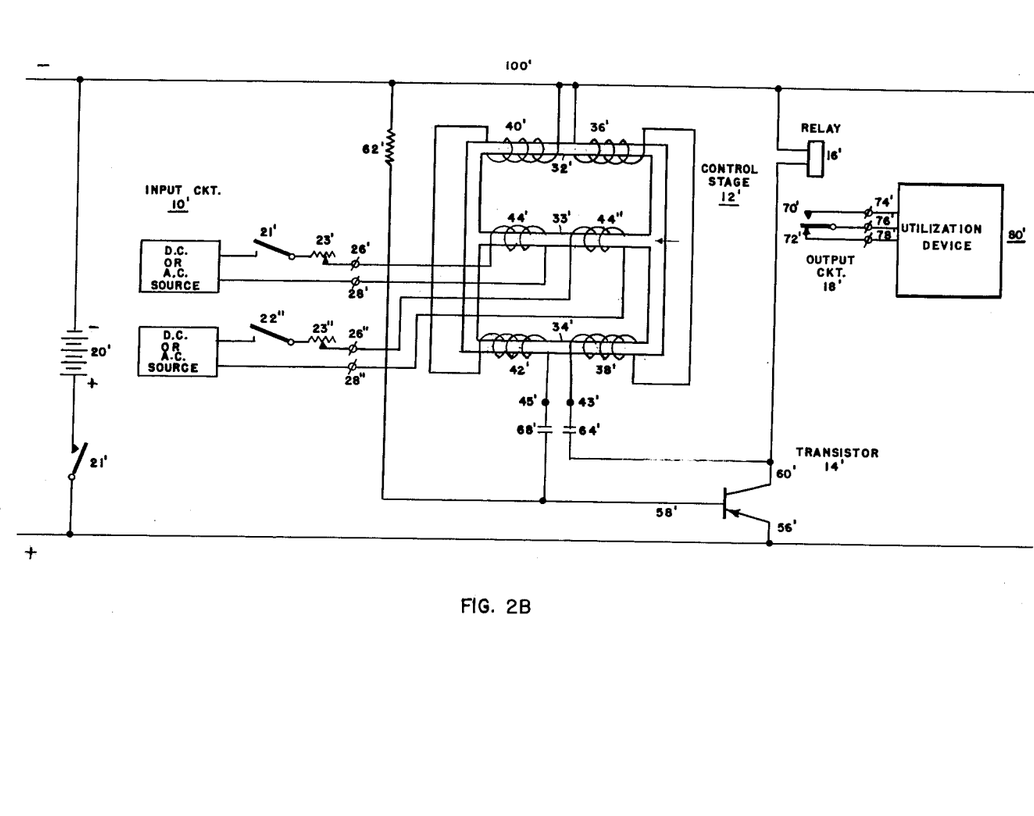

Referring to Figure 2B, there is shown therein a modification of Figure 2A in which the control stage 12' of device 100' comprises a saturable core device of the C and I type, including a three leg saturable reactor of the new type magnetic material having an essentially square hysteresis loop. Primary windings 36' and 38', corresponding to windings 36 and 38 set forth in Figure 2A, are wound on the upper leg 32', corresponding to toroid 32, and lower leg 34', corresponding to toroid 34, respectively and are connected in series relation between the battery negative pole and point 43' which corresponds to point 43 in Figure 2A. Similarly secondary windings 40' and 42' are wound on upper and lower legs 32' and 34' and are connected in series relation between the battery negative pole and point 45' corresponding to point 45.

The primary and secondary windings are so disposed that the feedback signal to the base causes the base to become more negative as conduction starts, the induction from primary to secondary being as described with reference to Figure 2A.

Control winding 44', corresponding to winding 44, is disposed on the middle leg 33' and controls saturation of both outside legs as is well known in the saturable core reactor art.

It should be noted that with windings 36' and 38' in series aiding relationship magnetic flux is set up in a closed magnetic circuit around the upper and lower leg circuits and there is no magnetomotive force established between the ends of the middle leg 33'. As a result no flux flows through the middle leg and there is no signal induced by primary windings 36' and 38' in the middle leg.

When a direct current potential or alternating current potential is coupled through switch 22' and rheostat 23' to winding 44', a magnetomotive force is created across the ends of the leg 33' causing flux to flow in parallel through the outside legs 32' and 34'. With rheostat 23' adjusted to pass enough current to provide saturation, the transformer action between primary and secondary windings is disrupted. Such action disables positive feedback for the transistor 14 and operation of the transistor as a blocking oscillator.

If desired a second control winding 44" can be provided on leg 33', and a source of direct current or alternating current is connected thereto over terminals 26" and 28" over switch 22" and rheostat 23'.

The control windings 44' and 44" can be connected and operated in aiding relationship whereby both switches 22' and 22" must be closed to effect sufficient magnetic decoupling of the primary and secondary windings 36', 38' and 40', 42' to cause oscillation to cease. Alternatively the windings 44' and 44" may be operated in opposed relationship whereby a proper differential in flux produced by the windings 44' and 44" must obtain to decouple the primary and secondary windings. In a further arrangement one control winding may be connected to a source of reference potential and the other control winding may be connected to a variable operating potential, whereby a given match between reference potential and operating potential must obtain to effect decoupling of primary and secondary windings. In a further mode of operation rheostats 23' and 23" may be varied singly or in combination to provide a range of input currents which vary core saturation between the pull-in and drop-out of the relay 16'. Other variations within the scope of the present disclosure may be apparent to those skilled in the art.

It should be observed that alternating current may be coupled to windings 44' and 44" to saturate the legs 32' and 34' if the change from the positive saturated condition to the negative saturated condition is fast enough to provide only extremely brief operation of the transistor oscillator 14 in blocking oscillator manner, and specifically, of such brief duration that the relay 16' does not have time to release. Adjustment of the operating circuit to effect positive relay holding in the operated condition may be effected by increasing the amplitude of the alternating current so that the period of non-saturation is shorter; by slowing the relay release by using a conventional sleeve structure, and by other methods which will be apparent to parties skilled in the art.

*Control device including non-saturable core*

Figure 3:
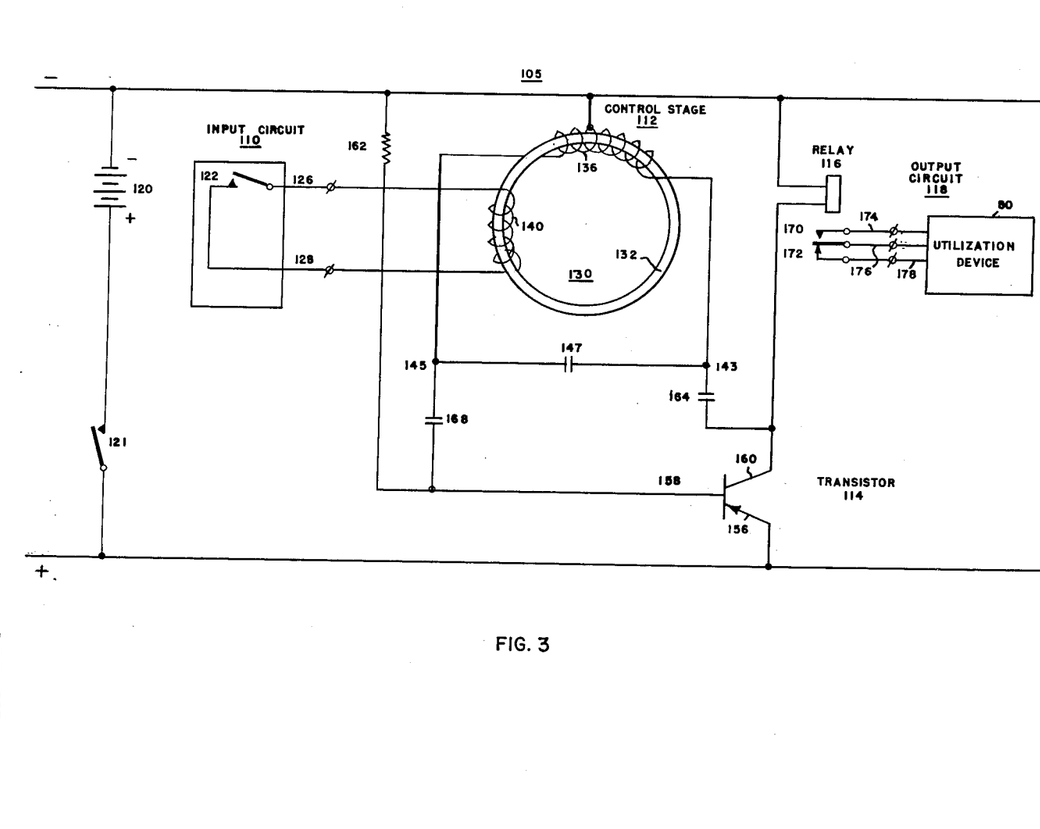
Figure 3 sets forth an additional embodiment of the novel control device which includes a control stage having an inductive short control arrangement for a non-saturable core device.

A second embodiment of the novel control device 105 is set forth in Figure 3, and as there shown includes an input circuit 110, a control stage 112, transistor unit 114, relay member 116 and an output circuit 118 interconnected in the manner of the arrangement of Figures 1 and 2. In the present arrangement, control stage 112 includes a transformer having a non-saturable core for controlling operation of the transistor to operate in a class C amplifier manner and alternatively in a steady state manner. As in the previous arrangement, operation of the transistor between such conditions effects a current flow for accomplishing the operation and release of relay 116.

More specifically, control device 105 includes a positive and negative supply conductor coupled to source 120 over switch 121, and an input circuit 110 which may comprise a switch 122 coupled to input terminals 126, 128 to complete a signal circuit thereto.

The control stage 112 comprises transformer unit 130 including a non-saturable core 132 having a winding 136 which is tapped at an intermediate point to negative supply conductor of source 120 to provide a primary and secondary winding in accordance with conventional practice. The input side of the primary winding is coupled to control stage input terminal 143, and the output side of the secondary winding is coupled to control stage output terminal 145. A separate control winding 140 is connected to input terminals 126, 128. Capacitor 147 is coupled across winding 136 to form a tank circuit therewith.

Transistor unit 114 is operatively coupled to the control stage 112, and is connected, in turn, to control the operation of relay 116 in accordance with the value of the output signals of control stage 112. More specifically, the transistor unit 114 includes an emitter element 156 which is coupled to the positive side of supply source; a base element 158 which is coupled over capacitor 168 to the output terminal 145 of control stage 112, and over bias resistor 162 to the negative side of the supply source; and a collector element 160 which is coupled over capacitor 164 to the input terminal 143 for control stage 112, and over relay 116 to the negative side of the supply source.

Relay 116 at associated contacts 170, 172 controls the completion and interruption of associated circuits which extend over output terminals 174, 176, 178 to utilization device 180.

In operation, with switch 121 closed and power source 120 coupled to the positive and negative conductors, the emitter element 156 is biased positive relative to the base element 158, and collector element 160 is biased negative relative to base element 158. In accordance with conventional transistor operation, current flow is initiated over transistor 114, the rising potential which appears in the collector circuit of transistor 114 being coupled over capacitor 164 to the input terminal 143 for the tank circuit comprised of inductance 136 and capacitor 147. In that the winding 136 is tapped to the negative side of the line at an intermediate point, the rising positive potential which appears at the input terminal 143 appears at output terminal 145 as a negative-going potential at point 143.

As a result of this first spurt of current, the tank circuit oscillates, and a potential of substantially sine wave waveform appears at point 145. The potential at point 145 is coupled over capacitor 168 to the base element 158 of the transistor 114, the circuit constants having been chosen to effect operation of the transistor as a class C amplifier. That is, the transistor is conductive during each cycle of operation of the tank circuit for the brief period of time of application of a potential to the base 158 which is slightly more negative than the emitter 156. As a result of these short periods of conductance of the transistor 114, short pulses of current appear in the collector circuit and are coupled over the relay 116, the average value of these short duration current pulses being insufficient to operate relay 116. The brief current pulses, however, are sufficient to maintain the tank circuit continuously in oscillation.

It is apparent that with the closure of the path across the control winding 140, an induced short of the primary portion of the winding 136 is effected to cause excessive losses. The values of the tank circuit are thus deteriorated sufficiently to terminate the oscillation thereof. The tank circuit in terminating its oscillation no longer drains a portion of the output of the transistor 114 for oscillatory purposes, and the sine wave output of the tank circuit which is coupled over capacitor 168 to the base element 158 of transistor 114 is terminated.

In such condition, the transistor is biased as previously described to conduct sufficient current to the winding of relay 116 to effect the operation thereof.

*Control device having non-saturable core and bridge input circuit*

Figure 4:
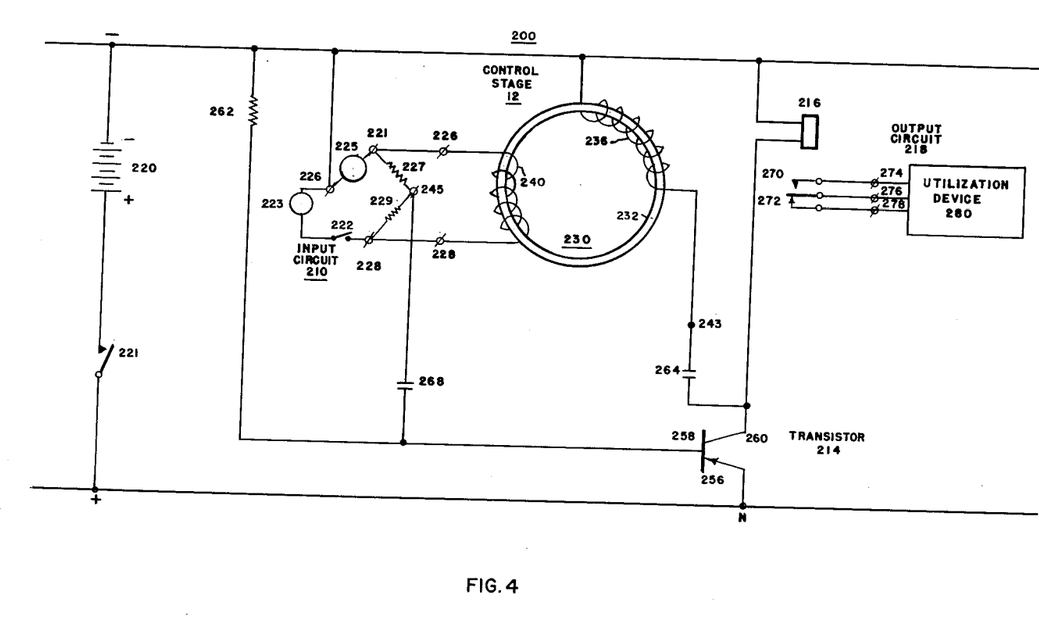
Figure 4 sets forth a further embodiment of the novel control device, including a control stage having a bridge for controlling operation of a non-saturable core member.

A further embodiment of the novel invention set forth in Figure 4 includes a bridge input circuit for adjusting a non-saturable core to control a transistor to operate in a blocking oscillator manner and alternatively in a steady state conducting manner. The transistor in its operation between such states effects the operation and release of an associated relay device.

With reference to Figure 4, the control device 200 is connected for selective energization from a power source 220 by a selector switch 221. An input circuit 210 for device 200 comprises a bridge circuit including first and second fixed resistor legs 227 and 229, a third fixed impedance arm 225 which may be comprised of resistance, capacitance, inductance, or a combination thereof. A coupling switch 222 permits selective coupling of a control signal in the fourth leg 223 of the bridge which is connected across bridge terminals 226, 228 respectively. The specific nature of the impedance in the third leg is determined by the nature of the impedance which is to be coupled in a fourth leg 223 of the bridge.

The external load resistor 223 may be a resistance member, a capacitance member, an inductance member, or any combination thereof. Further, such members may be temperature sensitive, stress or strain sensitive, or may comprise a rheostat which is mechanically coupled to physically movable members. As shown in more detail hereinafter, the sensitive control device is readily adapted for operation responsive to the application of input signals which are indicative of a large number of different types of electrical, mechanical or chemical changes.

Bridge terminals 221, 228 are coupled to the control stage 212; bridge terminal 226 is coupled to the negative side of the power source 220, and the signal output terminal 245 is coupled over capacitor 268 to the base circuit of the transistor unit 214.

Control stage 212 comprises a non-saturable toroid core 232 having a first control winding 236 and a second control winding 240. The first winding is coupled to control stage input terminal 243 and the negative side of power source 220. Control winding 240 is coupled across bridge terminals 221, 228.

Transistor 214 comprises an emitter element 256 coupled to the positive side of power source 220; a base element 258 coupled over capacitor 268 to bridge terminal 245, and over bias resistor 262 to the negative side of the power source 220; and a collector element 260 coupled over capacitor 264 to the control terminal 243 for control stage 212, and over relay 216 to the negative side of power source 220.

Relay 216 may comprise a relay of the type included in the previously described embodiments, and at its associated contacts 270, 272 is connected to control associated circuits which extend over output terminals 274, 276, 278 to a utilization device 280.

In operation, as switch 221 is closed, battery 220 is connected to the positive and negative conductors to bias emitter 256 positive relative to base 258, and to bias collector 260 negative relative to base 258. In accordance with known transistor operation, emitter base current flow results, and an emitter-collector current flow is established in the manner previously described. The rise in potential in the collector circuit is coupled over condenser 264 and the winding 236 on toroid 232 to the negative conductor, and the resultant changing magnetic field induces a changing potential across the secondary winding 240, the output of which is connected to points 221 and 228 of the bridge circuit 223. As noted previously, bridge circuit 223 comprises resistances 227 and 229 being connected to one side of capacitor 268. Accordingly, if the input impedance is of such a nature that the bridge balances, the signal output of control winding 240 will produce a zero potential change at point 245. Since there is no fluctuating potential at such terminal, no signal will be coupled across condenser 268 to the base electrode 258 of transistor 214, and the transistor accordingly will not oscillate. The transistor 214 as now biased provides a current flow sufficient to operate relay 216 in the manner previously described.

Assuming now that the input impedance 223 is of such a nature as to unbalance the bridge, and an output fluctuating potential is coupled by winding 240 to bridge terminals 221, 228, a potential signal related to the degree of bridge unbalance appears at point 245 and is coupled through condenser 268 to the base 258. Assuming that the feedback signal causes the point 145 to become more negative as the collector current increases, the bridge signal coupled to base 258 of the transistor becomes progressively more negative. The collector 260 conducts proportionately more current. As the base is held close to the potential of the battery positive pole due to the low resistance of the emitter-base path, condenser 268 charges. The transistor-emitter base current and the emitter-collector current thus rapidly increase to the point where the collector current is at a maximum. As the collector current flow increases to a maximum, the rate of change of current flow through winding 236 decreases to zero, at which time point 245 will have reached its most negative potential. Thereafter, the decrease in current through winding 236 results in a decrease in voltage across winding 240. Accordingly, the potential of point 245 becomes progressively more positive, in turn causing the base 258 of transistor 214 to become more positive. When the base 258 becomes as positive as the emitter 256, the transistor is blocked and the increasing positive potential of point 245 results in the base becoming more positive than the positive pole of the battery. Capacitor 268 which has charged during the buildup of the current over the transistor, now discharges over resistance 262 and the bridge circuit 223. When the condenser 268 has discharged to the point at which the base 258 becomes negative relative to the emitter 256, the transistor again conducts, and the cycle is repeated. The discharge current of capacitor 264 and the resultant spurts of current which appear in the collector circuit of transistor 214 are insufficient to operate the relay 216, and the relay remains in the restored condition.

If the input impedance 223 in the bridge 219 is of such a nature as to unbalance the bridge in such a direction that the feedback to the base causes the base to become more positive as oscillation starts up, the changing potential at point 245 ostensibly will not sustain oscillation of the transistor 214, and the normal negative bias of the base of transistor 214 results in a collector current which is of a value to operate the relay 216.

It is apparent from the foregoing description that whenever a bridge balance is obtained wherein the input impedance 223 balances the fixed impedance 225 such that no feedback to the transistor base results, and also whenever a bridge unbalance obtains such that the feedback signal causes the base to become more positive upon start of conduction, the transistor operates in a steady state conducting manner to energize relay 216. However, when a bridge unbalance of sufficient amplitude obtains such that the feedback to the base causes the base to become more negative upon start of conduction, the transistor operates in a blocking oscillator manner, causing relay 216 to assume its non-operated condition.

As noted heretofore, the utilization of a bridge input circuit 210 adapts the novel device for use with many different forms of sensing mechanisms. The control leg 223 may, for example, include a rheostat member which is coupled to the signal-providing-means by a mechanical link, whereby any form of motion may be converted into a resistance change, and control the utilization device by means of the sensitive device 200. Such devices may convert angular rotational movement or linear translational movement into control signals with equivalent ease.

The resistor element in leg 223 may also comprise a temperature sensitive resistance (such as a thermistor), a stress or strain resistance indicator, or a photosensitive device. Other indicating mechanisms which are adapted for use with the novel control device of the invention will be readily apparent to parties skilled in the art.

*Permanent magnet control device for saturable device*

In the embodiment set forth in Figure 2A, a control signal is coupled over the input circuit 10 to control winding 44 which is wound common to the cores of transformer 30 to electromagnetically effect the saturation of the transformer cores, and thereby the decoupling of the primary and secondary windings of the control stage. The control stage 12 in turn conditions the transistor for steady state operation rather than blocking oscillation type oscillation.

A mechanical arrangement for translating physical motion into a similar control operation is set forth in Figure 5, there shown, a magnet assembly 300 comprises a permanent magnet 301 with abutting soft iron pole pieces 302 and 305 as shown. A second soft iron pole piece 304 is mounted on pole piece 306 to direct the permanent magnet flux together with pole piece 302 to cores 32, 34 of transformer 30. The lower pole piece 304 is mounted on a pivot pin 306 to permit adjustment of the pole piece 304 in a direction away from the cores 32, 34 responsive to the application of a physical force 312 to the opposite end of the pole piece 304. Spring member 308 may be attached to a fixed member 310 to restore the movable pole piece 304 to a given position adjacent the core member 34.

It is apparent that in the position illustrated, the cores 32, 34 are saturated by the field output of pole pieces 302, 304, and as a result thereof the primary and secondary windings of the control stage 12 are decoupled relative to each other. Accordingly transistor 14 will operate as a transistor in a steady state conducting manner, and relay 16 will be in the operated position. With the application of a moving force via member 312 to the free end of pole piece 304 to separate the pole pieces 302, 304, the effective field relative to cores 32, 34 is proportionately reduced, and desaturation of the cores 32, 34 occurs. As sufficient desaturation of the cores 32, 34 is accomplished, the transistor 14 will be enabled in the oscillatory condition, and relay 16 will be restored in the manner previously described.

The technique of Figure 5 may be used in Figure 2B in lieu of the control windings 44' and 44" by saturating the core at the point indicated by an arrow for example. In this case the middle leg may be omitted.

*Conclusion*

A sensitive control device which is operable between a first and a second bistable condition responsive to the application of signal values of extremely small differential has been set forth herein. The novel control device is extremely sensitive in its response to the application of control signals of comparatively small magnitude, and accordingly readily adapts the unit for utilization in many different fields. Specific examples include control applications for temperature sensitive devices, stress and strain sensitive devices, and electronic control circuits, including arrangements wherein a change of condition is represented by the variation of a resistance, capacitance or inductance value, or any combination thereof.

The provision of a control device of such features and characteristics which is comprised basically of static electronic members and is additionally sufficiently flexible to permit the use thereof in the commercial field substantially independent of the parameters of the transistor amplifier circuit fulfills a definite need in the art. Furthermore, if the relay such as 16 is of the acceleration resistant type, further advantages and applications are made possible.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. A sensitive control device comprising an input circuit over which incoming control signals are received, a semiconductor member, an output circuit connected to said semi-conductor member, and a control stage including bias means for energizing said semiconductor member to couple an operating signal of a relatively large magnitude to said output circuit, oscillator circuit means connected to operate said semiconductor member as an oscillator device and to control same to couple a signal of a reduced magnitude to said output circuit, and control means operative at times to enable said oscillator circuit means, and operative at other times in response to receipt of a predetermined control signal over said input circuit to disable said oscillator circuit means and to render said bias means effective.

2. A sensitive control device comprising an input circuit over which control signals are received, a semiconductor member, an output circuit connected to said semiconductor member, and a control stage including bias means for energizing said semiconductor member to conduct a current of a relatively large magnitude over said output circuit, oscillator circuit means connected to operate said semiconductor as an oscillator device to reduce the magnitude of the current flow over said output circuit, and signal responsive means connected to said input circuit operative in response to certain of said control signals to render said oscillator circuit means effective and operative in response to others of said control signals to render said bias means effective.

3. A sensitive control device comprising an input circuit, a semiconductor member, a relay member connected for control by said semiconductor member, and a control stage including bias means for biasing said semiconductor member to conduct a relatively large current for said relay to operate the same, oscillator means connected to energize said semiconductor member in an oscillatory operation to provide a reduced current of a value to effect the release of said relay, and control means operatively controlled in response to receipt of control signals over said input circuit operative at times to render said oscillator circuit means effective and controlled at other times to disable said oscillator circuit means and to render said bias means effective.

4. A sensitive control device comprising a signal input circuit, a semiconductor member, an input and an output circuit for said semiconductor member, and a control stage including bias means for coupling control signals to said semiconductor input circuit to control same to conduct a current of a first predetermined relatively large value in said semiconductor output circuit, oscillator circuit means including a feedback path connected between said output circuit and said input circuit for said semiconductor to operate said semiconductor as an oscillator to provide a substantially reduced current output over said output circuit, a saturable core transformer having a primary and secondary winding connected in said feedback path, and at least one control winding coupled to said signal input circuit operative to disable said feedback path over said windings responsive to receipt of a predetermined control signal over said signal input circuit and to render said bias means effective.

5. An arrangement as set forth in claim 4 in which said primary and secondary windings are wound on said core in an inductively coupled relation, and said control winding is wound on said core to saturate the core responsive to receipt of a signal of a predetermined value over said input path to thereby decouple the primary and secondary windings.

6. An arrangement as set forth in claim 4 in which said primary and secondary transformer windings are capacitively coupled between said semiconductor output and input circuits.

7. A sensitive control device comprising a signal input circuit, a semiconductor member, an input and an output circuit for said semiconductor member, and a control stage including bias means for coupling control signals to said semiconductor input circuit to control same to conduct a current of a first predetermined value in said semiconductor output circuit, oscillator circuit means including a feedback path connected between said output circuit and said input circuit for said semiconductor to operate said semiconductor as an oscillator to provide a substantially reduced current output over said output circuit, a saturable core transformer having a primary and secondary winding connected in said feedback path in inductive relation with each other, a first control winding wound on said core, reference means operative to normally couple a signal to said control winding to disable the inductive relation between said primary and secondary windings and thereby the said feedback path for said oscillator circuit, and a second control winding wound on said core and connected to said signal input circuit to render said first control winding ineffective responsive to receipt of a predetermined control signal over said signal input circuit.

8. A sensitive control device comprising a semiconductor member, an input and an output circuit for said semiconductor member, and a control stage including bias means for coupling control signals to said semiconductor input circuit to control same to conduct a current of a first predetermined value in said semiconductor output circuit, oscillator circuit means including a feedback path connected between said output circuit and said input circuit for said semiconductor to operate said semiconductor as an oscillator device to provide a substantially reduced current output over said output circuit, and control means including a saturable core transformer having a primary and secondary winding connected in said feedback path, and means for coupling input signals to said saturable core to disable said feedback path and said oscillator circuit means and to simultaneously render said bias means effective.

9. An arrangement as set forth in claim 8 in which said means for coupling input signals to said saturable core comprises a permanent magnet member adjustable to different flux inducing positions relative to said core to correspondingly adjust the degree of saturation thereof.

10. A sensitive control device comprising a semiconductor member, an input and an output circuit for said semiconductor member, and a control stage including bias means for coupling control signals to said semiconductor input circuit to control same to conduct a current of a first predetermined value in said semiconductor output circuit, oscillator circuit means including a feedback path connected between said output circuit and said input circuit for said semiconductor to operate said semiconductor as an oscillator device to provide a substantially reduced current output, a non-saturable core having a primary and secondary winding wound thereon and connected in said feedback path, capacitive means connected across said windings, a control winding wound on said core, and signal input means for enabling said control winding to disable said feedback path and said oscillator circuit means to thereby render said bias means effective.

11. An arrangement as set forth in claim 10 in which said capacitive means and said primary and secondary windings are connected as a tank circuit for operating said semiconductor as a class C amplifier, and said signal input means are operative to connect said control winding to said core to alter the value of inductance in said tank circuit and thereby terminate oscillation of the tank circuit.

12. A sensitive control device comprising an input circuit, a semiconductor member, an input and an output circuit for said semiconductor member, and a control stage including bias means for coupling control signals to said semiconductor input circuit to control same to conduct a current of a first predetermined value in said semiconductor output circuit, and oscillator circuit means including a feedback path connected between said output circuit and said input circuit for said semiconductor to operate said semiconductor as an oscillator to provide a substantially reduced current output, a non-saturable core transformer including a primary and secondary winding wound thereon and connected in said feedback path, capacitive means connected across said windings to establish a tank circuit with said windings in said feedback path, a control winding wound on said core, and circuit means operative to disable said tank circuit responsive to receipt of a predetermined signal over said input circuit; and a relay member connected to the semiconductor output circuit operated from a first to a second bistable condition only in response to a current flow of said first predetermined value.

13. A sensitive control device comprising a semiconductor member, an input and an output circuit for said semiconductor member, and a control stage including bias means for coupling control signals to said semiconductor input circuit to control same to conduct a current of a first predetermined value in said semiconductor output circuit, oscillator circuit means including a feedback path connected between said output circuit and said input circuit for said semiconductor to operate said semiconductor as an oscillator and thereby provide a substantially reduced current flow over said output circuit, a bridge circuit connected in said feedback path including at least one reference leg, and signal input means for coupling signals of a variable value to a second leg of said bridge to control the value of the signal output coupled over said feedback path to the input circuit for said semiconductor to thereby adjust same between the oscillating and non-oscillating states.

14. An arrangement as set forth in claim 13 in which said first and second bridge legs each include at least one impedance member, and in which equal values of impedance in said first and second legs controls said bridge to provide a signal which effects increased circuit flow in the output circuit of said semiconductor member.

15. A sensitive control device comprising an input circuit, a semiconductor member having at least an emitter, collector and base electrode, an output circuit connected to one of said electrodes, and a control stage including bias means for energizing said electrodes of said semiconductor member to conduct a first value of current in said output circuit, oscillator circuit means connected to operate said semiconductor as an oscillator including a feedback path connected between said output circuit and one of the other electrodes, and signal responsive means operative in response to receipt of predetermined different control signals over said input circuit to respectively couple enabling and disabling signals to said oscillator circuit.

16. A sensitive control device comprising an input circuit, a semiconductor member having at least an emitter, a collector and a base electrode, an output circuit including a relay member connected to said collector electrode, and a control stage including bias means for energizing said electrodes of said semiconductor member to conduct an amplified relay operating current in said output circuit, oscillator circuit means including a feedback path connected between said collector electrode and said base electrodes operative to energize said semiconductor as an oscillator and thereby reduce the current flow in the output circuit thereof to restore said relay, and signal responsive means operative in response to receipt of different control signals over said input circuit to respectively control the enablement and disablement of said feedback path.

References Cited in the file of this patent

UNITED STATES PATENTS

| | | |
|---|---|---|
| 2,759,124 | Willis | Aug. 14, 1956 |
| 2,773,219 | Aron | Dec. 4, 1956 |
| 2,801,374 | Svala | July 30, 1957 |